April 17, 1945.  E. H. HAMMOND ET AL  2,373,755
FLUID PRESSURE SIGNAL
Filed Aug. 4, 1942   2 Sheets-Sheet 1
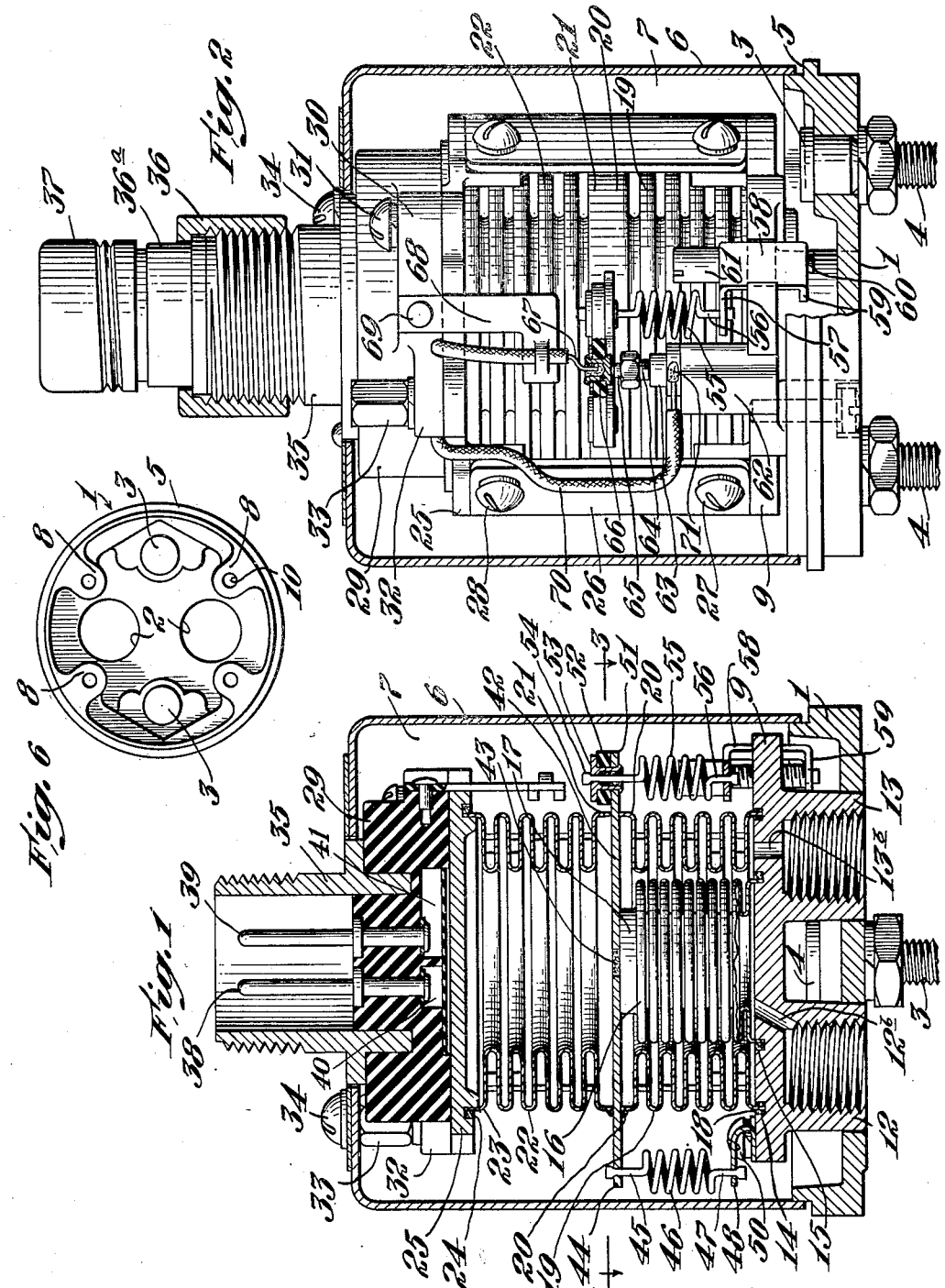
Inventors
Elmer H. Hammond
Ernest H. Grauel
by Roberts Cushman & Woodberry Att'ys.

April 17, 1945.  E. H. HAMMOND ET AL  2,373,755
FLUID PRESSURE SIGNAL
Filed Aug. 4, 1942  2 Sheets-Sheet 2
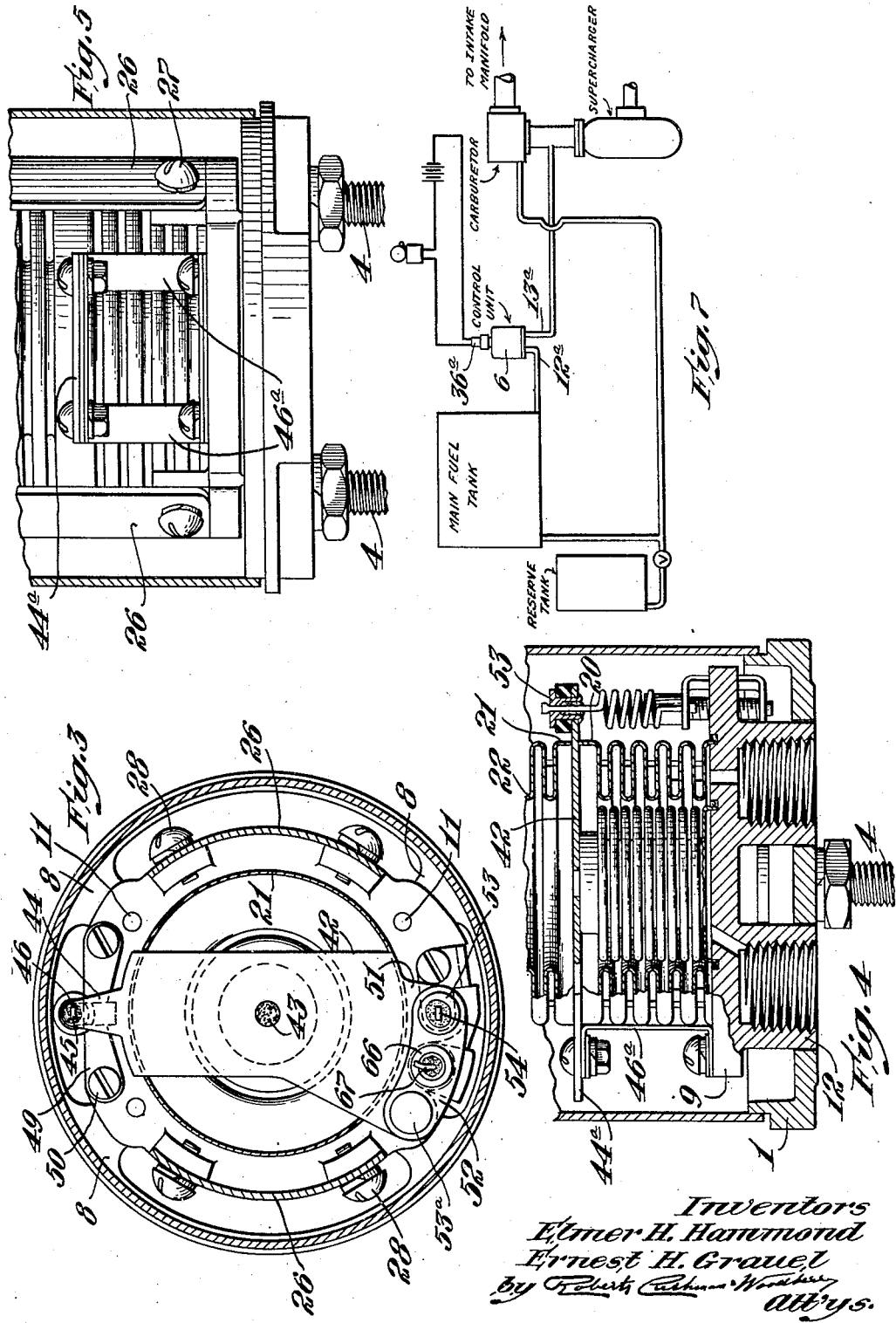
Inventors
Elmer H. Hammond
Ernest H. Grauel
by Roberts Cushman Woodbury
Attys.

Patented Apr. 17, 1945

2,373,755

UNITED STATES PATENT OFFICE 2,373,755

FLUID PRESSURE SIGNAL

Elmer H. Hammond, Fairfield, and Ernest H. Grauel, Bridgeport, Conn., assignors to Manning, Maxwell & Moore, Incorporated, New York, N. Y., a corporation of New Jersey Application August 4, 1942, Serial No. 453,530

31 Claims. (Cl. 200—83)

This invention pertains to signals, and relates more particularly to a signal designed to give warning of the drop, to a predetermined point, of the pressure exerted by a fluid. While of more general utility, the invention is intended for use specifically as a means of warning the pilot of an airplane that the fuel in the main supply reservoir has dropped to a level such that the reserve supply should be cut in. Usually the actual warning signal is by means of an electrically energized bell, buzzer or lamp, and the present invention is particularly concerned with that portion of the signaling apparatus which closes the signal circuit under predetermined conditions.

For military aircraft, such signalling apparatus must conform to certain standard regulations. Thus, among other things, the circuit closing means must respond to a differential pressure, one element of which is the substantially constant air pressure delivered by the supercharger, and the other element of which is the fuel injection pressure exerted by the fuel pump, this latter pressure being normally the higher of the two. It is a further requirement that any electrical contacts, between which arcing may occur, be separated from any fuel chamber by at least two thicknesses of metal so as to avoid danger from leakage of the inflammable fuel from such chamber. The signaling device must be so designed that it is not substantially affected by changes in barometric pressure such as occur when the plane rises from the ground to the highest flying level. Moreover, the instrument must be capable of adjustment so as to close the signal actuating circuit at any selected one of widely different differential fuel pressures, for instance pressures varying between two pounds and twenty pounds per square inch.

In addition to these standard requirements, it is highly desirable that the adjustment for different fluid pressure heads be easy to make, and also that such adjustment be very accurate; that such adjustment may be accomplished without substantially affecting the neutrality of the instrument with respect to barometric changes; that the instrument be rugged and positive in action and equally effective at all altitudes; that the apparatus be compact and of small dimensions and light in weight; and that the apparatus be capable of installation in any airplane without requiring special fixtures or great care or skill in installation.

The principal object of the present invention is to provide signal means of the type above referred to, and in particular to provide automatic circuit controlling means for such a system having all of the above required and desirable characteristics.

Other and further objects and advantages of the invention will be pointed out in the following more detailed description and by reference to the accompanying drawings wherein Fig. 1 is a diametrical section, to enlarged scale, illustrating a preferred embodiment of the control unit of the present invention;

Fig. 2 is a side elevation looking from the right-hand side of the device of Fig. 1 but partly in vertical section;

Fig. 3 is a section substantially on the line 3—3 of Fig. 1;

Fig. 4 is a fragmentary section similar to Fig. 1 but illustrating a modification;

Fig. 5 is a fragmentary view similar to Fig. 2 but showing the modification of Fig. 4;

Fig. 6 is a plan view of the base plate of the unit removed from the other parts; and Fig. 7 is a diagram illustrating the utility of the control unit.

Referring to the drawings the numeral 1 designates the base member of the unit, said base member being here shown as circular in contour and as having two openings symmetrically spaced at opposite sides of its axis which receive headed studs 3 (Figs. 2 and 6) which pass down through the base member and are screw threaded at their lower ends as shown at 4 to facilitate mounting the device upon any appropriate support.

The outer peripheral surface of this base member is shaped to provide a recess 5 which receives the lower edge of the protective cover or cap 6. This protective cover or cap may be of any suitable material, for example sheet metal or a moulded plastic and together with the base defines a chamber 7 within which the operative parts of the instrument are housed. While this cover or cap 6 is designed to protect the operative parts from rain and dust, it is not air-tight and thus the interior of the housing is always subject to variations in atmospheric pressure.

The base member 1 is furnished with a plurality of upstanding bosses 8 (Figs. 3 and 6) which form supports for the lower head 9 of the bellows device. These bosses 8 have openings 10 which receive screws 11 entering screw threaded openings in the head 9 thereby to unite the head to the base.

The head member 9 is provided with diametrically opposite downwardly directed hollow bosses 12 and 13, respectively, whose lower ends fit into openings 2 (Fig. 6) in the base member 1, the bosses being internally screw threaded, preferably with pipe threads, to form sockets for the reception of the ends of the conduits 12ª and 13ª, respectively, Fig. 7, leading from the fuel supply tank and from the air delivery of the supercharger.

The upper surface of the head 9 is furnished with concentric grooves 14 and 15 respectively. A passage 12ᵇ extends up from the socket in boss 12 into the space defined by the inner of these grooves while a similar passage 13ᵇ leads from the socket in boss 13 up through the head 9 into the space between the channels 14 and 15.

A downturned flange (Fig. 1), at the lower end of an expansible, contractible, metallic, contact-actuating bellows 16, seats in the groove 15 and is soldered leak-tight therein. This bellows is closed at its upper end as shown at 17 and its interior always communicates, by means of the passage 12ᵇ with the conduit 12ª. This contact-actuating bellows 16 constitutes a pressure motor responsive to variations in liquid head in the main fuel tank.

Seated in the groove 14 and soldered leak-tight therein is the downturned lower flange 18 (Fig. 1) of a pressure responsive expansible, contractible, metallic bellows 19 whose interior is always exposed to the substantially constant super-atmospheric pressure which is maintained at the delivery of the supercharger, while its outside is always exposed to atmospheric variations. The upturned, upper flange 20 of this bellows 19 is integrally joined to the downturned lower flange 21 (Figs. 1 and 2) of a second bellows 22 similar to the bellows 19 and preferably of the same normal diameter as the latter. The upper, upturned flange 23 of the bellows 22 is seated in a groove 24 in the lower surface of the upper head member 25, being soldered leak-tight in said groove. This head 25 is imperforate and forms a closure for the upper end of the bellows 22.

The interiors of the two bellows 19 and 22 are always in free communication, the two bellows together constituting a constant pressure unit operative to maintain a substantially constant pressure at the outside of bellows 16. The heads 9 and 25 of the bellows structure are held in unvarying spaced relation by means of rigid posts 26 which are secured to the heads 9 and 25, respectively, by screws 27 and 28. The bellows 16, housed within the bellows assembly 19, 22 thus constitutes a differential motor responsive only to variations in fuel head.

The upper head 25 supports an insulating block 29 (Figs. 1 and 2) which may be of any suitable insulating material, for example a moulded synthetic resin, hard rubber or the like. This insulating block 29 is furnished with diametrically arranged outstanding lugs 30 (only one being shown) which receive screws 31 whose lower ends enter screw-threaded openings in the head 25. The block is also provided with diametrically disposed lugs 32 which receive the lower end portions of upstanding posts 33, the lower ends of said posts being screw-threaded and entering screw-threaded openings in the head 25. The block 29 is thus firmly secured to the head 25. The upper ends of the posts 33 are provided with internally screw-threaded openings which receive screws 34 (Fig. 1), passing down through openings in the top of the cap 6 thereby removably securing the cap to the block 29.

A nipple member 35 is rigidly secured at its lower end, for example, by being moulded into the block 29, so as to form in effect a part of the block, and the outer portion of this nipple is externally screw-threaded for the reception of an internally screw-threaded collar 36 (Fig. 2) forming part of a union 36ª by means of which one end of an armored conductor cable (not shown) may be attached to the control unit. As shown in Fig. 2, a removable cap 37 is mounted on the upper end of the union 36ª as a temporary protection for the latter, said cap being removed and discarded when the cable is attached.

Two contact posts 38 and 39 are housed within the nipple 35, the lower portions of these posts being imbedded in the insulating material of the block 29. The lower ends of these posts are exposed within chambers 40 and 41 in the under side of this block, said chambers being normally closed at their lower parts by a removable plate of insulating material disposed just above the upper head 25 of the bellows assembly.

A motion-transmitting member or bar 42 (Figs. 1 and 3) extends transversely across the bellows assembly, substantially at the plane of union of the upper end of the bellows 19 with the lower end of the bellows 22. This member or bar 42 is substantially rigid; for example of sheet metal; and preferably of the contour shown in plan in Fig. 3, and is rigidly united, for example by spot welding to the center of the head 17 of motor bellows 16. While this transmission member extends diametrically across the bellows assembly, it does not shut off communication between the interiors of the bellows devices 19 and 22, as shown in Fig. 3. At the points where this transmission member or bar emerges from the bellows assembly, it is secured leak-tight, for example by silver soldering, to the flanges 20 and 21 of the bellows devices. While as here illustrated, the member 42 is a single integral part extending diametrically across the bellows assembly, it is contemplated that other and equivalent transmission means may be employed.

At one end, this transmission member 42 has a relatively narrow extension 44 (Figs. 1 and 3) provided with a small aperture which receives the upper end 45 of a tension spring 46. The lower end of this spring passes through a small opening in a stiff but bendable arm 48, which is secured to or forms an integral part of a bracket 49 (Fig. 3) which is secured to the lower head 9 by screws 50. At the points where the ends of the spring 46 pass through the part 44 and the part 48, respectively, it is preferred to secure the ends of the spring by silver soldering or the like so that there can be no relative motion between the ends of the spring and the parts to which it is attached.

The opposite end 51 (Fig. 3) of the transmission member 42 is wider than the part 44 and is bifurcated to provide spaced arms to whose upper surfaces, outside of the bellows, an insulating plate 52 is so attached as to bridge the space between the arms. At a point diametrically opposite to that at which the end 45 of the spring 46 is attached, the transmission member 42 is provided with an opening which receives a sleeve member 53 (Fig. 1) extending down through the insulation 52, the sleeve being fixed to member 42, and to this sleeve is secured, by silver soldering, the upper end 54 of a tension spring 55. The sleeve 53 constitutes a rivet for securing the plate 52 to one of the spaced arms of member 42 while a rivet 53ª secures the plate 52 to the other of said arms. The lower end 56 of this tension spring is secured, preferably by silver soldering, to the inwardly directed substantially horizontal upper arm 57 of a slide member 58 (Fig. 2) arranged to slide vertically in a slot provided in the edge of the head member 9. This slide member 58 is also furnished with an inwardly directed arm 59 at its lower end, below the member 9. The member 9 is provided with a screw-threaded bore which receives the screw-threaded intermediate portion of an adjusting screw 60 having an unthreaded tip which is arranged to turn in an opening in the arm 59 and which has a head 61 resting upon the upper surface of the arm 57 and which may be turned thereby to adjust the slide member 58 vertically. Such adjustment of the slide member varies the tension of the spring 55 and thus varies the downward force which this spring exerts upon the transmission member 42. While ordinarily the tension of the other spring 46 remains constant, it is possible to vary its tension by bending the arm 48, and in the manufacture of this device the maker will bend the arm 48, as determined by experimental test, until the spring 46 has been placed under proper tension. While the bendable arm 48 is for most purposes adequate and is cheap to make and install, it is contemplated that a screw adjustment for varying the tension of the spring 46 may be provided if desired.

A block 62 (Fig. 2) of insulating material is set into a slot in the edge of the head member 9 and rigidly secured therein in any desired manner. This block has fixed therein, for example by moulding, a metallic sleeve member 63 having an internally screw-threaded bore which receives the vertically adjustable contact screw 64, preferably provided with a silver contact 65 at its upper end. This silver contact is designed to make electrical contact, at times, with a silver contact formed on the lower end of a sleeve or hollow rivet 66 which is fixed in an opening in that part of the insulating plate 52 which bridges the space between the arms of part 42. The lower end 67 (Fig. 2) of an insulated conductor is soldered to this sleeve or rivet 66. This conductor 67 has a U-bend or coil near its attachment to the rivet 66 so as permit free up and down motion of the part 42, but preferably the upper part of conductor 67 is supported by a rigid bracket 68 attached by a rivet 69 to the insulating block 29. The upper part of this conductor 67 is passed through a suitable slot in the lower surface of the insulating block 29 and into the chamber 41 where the end of the conductor is soldered to the lower end of the post 39.

A second flexible, insulated conductor 70 has its lower end 71 secured by solder to the metallic sleeve 63 which carries the contact screw 64. This conductor 70 extends upwardly and its upper portion passes through a suitable slot in the under side of the insulating block 29 and into the chamber 40, where the upper end of the conductor is secured by solder to the lower end of the post 38.

As above pointed out, there are certain definite requirements which must be met as respects the construction and functioning of devices of this type, particularly for military use. For the latter use it is a basic requirement that the control unit be responsive to a differential pressure, the higher pressure being the pressure head of the fuel in the main fuel tank and the lower pressure, which is a substantially constant pressure, being that of the air delivered to the engine by the supercharger. When the differential pressure drops below a predetermined value, an electric circuit is closed, thereby causing a signal, such as a light or buzzer, to act. It is a further military requirement that the fuel-receiving chamber of the control unit be spaced from the electrical contacts by at least two separate metallic walls in order to insure against any accidental ignition of fuel vapor by sparking at the contact, even though a leak might develop in the fuel-receiving chamber of the unit.

Since these devices are commonly used in aircraft, they must be so designed or so compensated that they will not be affected by changes in barometric pressure. And it is a further requirement that the contact points be so arranged that they may be adjusted to close the circuit at different pressure heads in the fuel tank, for example anywhere between a two-pound and a twenty-pound head.

It has heretofore been proposed to compensate for variations in barometric pressure by the use of two matched metallic bellows arranged to oppose each other, with fuel pressure in one and supercharger pressure in the other but the employment of such an arrangement is complicated by the fact that when two matched opposed bellows are used, the effective area of the two bellows is only equal at one point in their travel. The reason for this is that when such a metallic bellows is shortened, its transverse area increases, and conversely, when it is lengthened, its effective transverse area decreases. Thus if two bellows are arranged coaxially with their movable ends opposed to each other and connected by the contact device for moving the latter, and if in one position of the contact the two bellows are exactly matched as to transverse area, the moment the contact begins to move (with concomitant shortening of one bellows and lengthening of the other) the bellows are no longer matched and thus the assembly would no longer be compensated for changes in barometric pressure.

The present construction as above described allows of the use of two coaxial bellows designed to compensate for atmospheric pressure, while at the same time permitting a substantial variation in the pressure head at which the contacts separate and likewise provides two independent metallic walls between the fuel-receiving chamber of the unit and the contacts.

In setting the device for operation it is necessary first to adjust the bellows 19 and 22 so as to make the effective areas of the two bellows equal. The screw 61 is first adjusted so that the contacts 65 and 66 separate at a predetermined pressure within the motor bellows 16. The unit is then placed in a bell jar, under partial vacuum, so that only the outside of the bellows assembly is subjected to reduce pressure. If, under these conditions the contacts 65 and 66 separate by reason of the reduced atmospheric pressure on the exterior of the bellows, then the area of the bellows 22 is greater than that of the bellows 19. To overcome this inequality the actuator lever 42 must be moved upwardly by turning the contact screw 64 upwardly in the sleeve 63. On the other hand if in testing the device under the bell jar the contacts 65 and 66 move toward each other, then the contact screw 64 should be screwed downwardly. The making and breaking of the circuit during such test may easily be determined by connecting a lamp into the contact circuit.

Once the bellows assembly has thus been adjusted and the contacts set as just described, the predetermined pressure at which the contacts will break can be changed merely by adjusting the screw 61.

As an example of the above procedure, let it be supposed that the effective areas of the bellows 19 and 22 are to be equal at a pressure of twelve pounds within the motor bellows 16. This pressure is first applied to the inside of the bellows 16 and the springs 46 and 55 are adjusted until, when tested as above described under reduced atmospheric pressure, the effective areas of the bellows 19 and 22 are equal. In making this adjustment the tension of spring 46 is varied by bending the bracket 48 while the tension of spring 55 is changed by turning an adjusting screw 61. When thus adjusted, the actuator 42 will be approximately horizontal. The contact points are now just ready to separate and there is a twelve-pound pressure in the bellows 16. Suppose it now be desired to adjust the device so that the contacts will only separate when there is a pressure of twenty pounds in the bellows 16. It is merely necessary to screw the screw 61 downwardly, thereby increasing the tension of spring 55. The member 42 cannot move downwardly since the contact 61 already rests upon the contact 65 which acts as a fixed abutment. The only effect of thus further tensioning the spring 55 is to make it more difficult for the motor bellows 16 to expand. Thus by properly tensioning the spring 55, upward motion of the head of the bellows 16 may be prevented until the internal pressure in said bellows is approximately twenty pounds. When this pressure is reached, the downward force exerted by the springs 46 and 55 is balanced and the contacts are on the point of separating. A slight further increase in pressure will separate them. However, it is to be noted that although the contacts now separate at a pressure of twenty pounds instead of the original pressure of twelve pounds, the actuator 42 is in substantially the same horizontal position, which means that the relative lengths of the bellows 19 and 22 have not been changed in adjusting the device from 12 to 20 pounds. Thus the effective areas of the bellows is the same throughout this entire range of adjustment, from twelve to twenty pounds, and the adjustment from one actuating pressure to another does not in any way affect the compensation for atmospheric variations. At very high altitudes there may be a slight error since that end of the member 42 to which the spring 46 is secured is not held against a fixed stop. This error is very slight and less than the permissible error in existing specifications. This error may be entirely eliminated if desired by bending the bracket 48 at the same time the screw 61 is adjusted.

Another way of avoiding this error is by the use of such a modfied arrangement as is shown in Figs. 4 and 5. Here the coil spring 46 is replaced by a pair of leaf springs 46ª. The upper ends of these springs are fixed to extension 44ª of the actuator member 42 and their lower ends are fixedly secured to the member 9. In other respects the device is similar to that above described but in this arrangement the length of the springs 46ª is invariable and although these springs are always under tension the position of the end 44ª of the member 42 will not change regardless of the adjustment of the spring 55.

It is to be noted that the adjustment of the instrument is very accurate and that the device is very sensitive. In prior devices, when it was attempted to adjust for varying fuel pressure heads, it was done by raising or lowering the normally fixed contact, but since the bellows system has only a very slight movement, such mode of adjustment for a small change in pressure was quite difficult. However, in the present arrangement such adjustment is made by changing the tension of the spring 55 and it is readily possible to employ a spring of such type that several full turns of the screw 61 will be required to make even a small change in the point of separation of the contacts.

In the operation of the device, the interior of the bellows 16 is always exposed to the pressure head in the main fuel tank while the space within the bellows assembly 19, 22 and outside the bellows 16 is exposed to the substantially constant supercharger air pressure. At the same time, the bellows 19 and 22 are externally exposed to the atmosphere. The device is initially set so that the contact points 65 and 66 will remain separated until the pressure head in the fuel tank drops to the selected value at which point the bellows 16 permits the springs to move actuator 42 downwardly and thus cause the contacts to engage. This closes the signal circuit giving warning to the pilot that he should cut in the auxiliary fuel supply.

It may be noted that the provision of the adjustment whereby the effective areas of the two bellows may be equalized makes it possible to use bellows which initially have unequal areas if desired. Furthermore, because the springs 46 and 55 overcome most of the hysteresis in the bellows system the contacts engage and disengage always substantially at the same fuel pressure, regardless of how many times or how frequently the apparatus may operate.

While certain desirable embodiments of the device have herein been described it is to be understood that the invention is not necessarily limited to these precise arrangements but is to be regarded as broadly inclusive of any and all modifications and equivalents thereof.

We claim:

1. A switch-actuating control unit for use in an aircraft fuel supply system of the kind wherein an alarm is caused to operate by the closing of an electric switch, said control unit comprising a differential pressure motor having a chamber which freely communicates with the fuel supply, said motor being operative to cause the switch to close when the fuel pressure drops to a predetermined point, non-inflammable walls defining an air-tight chamber which houses said motor, the switch being outside of said chamber, and means passing air-tight through the wall of said chamber and operative to transmit motion from the motor to the switch.

2. A switch-actuating control unit for use in an aircraft fuel supply system of the kind wherein an alarm is caused to operate by the closing of an electric switch, said control unit comprising a differential pressure motor having a moving part exposed at one side to the fluid pressure in the fuel supply line, metal walls defining an air-tight chamber which houses the motor and which protects the opposite side of said movable motor part from varying atmospheric pressure, the switch being located outside of said chamber, and an actuator connected to said movable motor part and passing air-tight out through the metal wall of the chamber, the outer end of said actuator being operatively connected to the switch.

3. A switch-actuating control unit for use in an aircraft fuel supply system of the kind wherein an alarm is caused to operate by the closing of an electric switch comprising a movable contact and a normally fixed but adjustable contact, said control unit comprising a differential pressure motor having a moving part exposed at one side to the fuel pressure, non-inflammable walls defining an air-tight chamber which houses the motor and which protects the opposite side of said movable motor part from varying atmospheric pressure, the switch being located outside of said metal walls, an actuator connected to said movable motor part and passing airtight out through the metal walls of the chamber, the outer end of said actuator being operatively connected to the movable switch contact, and adjustable loading means urging the movable contact toward the normally fixed contact.

4. Apparatus of the class described comprising a pair of relatively movable electrical contacts, and motor means for moving one of said contacts relatively to the other, said motor means including a metallic actuator bellows designed to contain inflammable fluid whose pressure varies, and an outer expansible housing bellows which encloses the actuator bellows and which is designed to contain fluid at substantially constant pressure, and motion transmission means extending from the actuator bellows outwardly through the wall of the housing bellows for transmitting motion to the movable contact.

5. In combination in apparatus of the class described, a pair of coaxial opposed bellows whose interiors collectively constitute a single chamber, a normally fixed contact, a movable contact rigidly secured to the bellows for actuation by the latter, a pressure fluid motor so arranged that its pressure-sensitive element is constantly exposed to the pressure subsisting within the opposed bellows, said pressure switch being operative to separate said contacts, means for adjusting the normally fixed contact thereby to insure substantially equal effective areas of the two bellows at the instant of separation of the contacts, and adjusting means operative to determine the pressure at which the contacts shall separate.

6. In combination in apparatus of the class described, a pair of coaxial opposed bellows whose interiors collectively constitute a single elongate chamber within which a constant fluid pressure is maintained, a normally fixed contact, a movable contact rigidly secured to the bellows for actuation by the latter, a pressure fluid motor housed within one of said bellows and having a pressure-sensitive element which is always exposed to the pressure within said chamber, said pressure motor being operative to separate said contacts, means for adjusting the normally fixed contact thereby to insure substantially equal effective areas of the two bellows at the instant of separation of the contacts, and an adjustable loading spring operative to urge the contacts toward each other with a predetermined force thereby to insure separation of the contacts at a predetermined fluid pressure.

7. In combination in apparatus of the class described, a pair of coaxial opposed bellows whose interiors collectively constitute a single constant pressure chamber, a normally fixed contact, a movable contact rigidly secured to the bellows, a pressure fluid motor housed within said chamber, said pressure motor comprising a pressure-sensitive element which is always exposed to the pressure subsisting in said chamber, said pressure motor being operative to separate said contacts, means for adjusting the normally fixed contact thereby to insure substantially equal effective areas of the two bellows at the instant of separation of the contacts, a loading spring operative to urge the contacts toward each other, and means whereby the load imposed by said spring may be accurately varied.

8. In combination in apparatus of the class described, a pair of coaxial bellows having their opposed movable ends united and their interiors arranged collectively to constitute a single chamber, a movable part secured to said bellows at their point of union, means operative to adjust said part thereby to vary the relative lengths of said bellows until their effective areas are substantially equal, and loading means operative to oppose movement of said part from its position of adjustment.

9. In combination in apparatus of the class described, a pair of coaxial bellows having their opposed movable ends united, a movable part secured to said bellows at their point of union, means operative to adjust said part thereby to vary the relative lengths of said bellows until their effective areas are substantially equal, adjustable loading means operative to urge said part in one direction, and rigid stop means normally holding said part in a position such that the effective area of the two bellows is substantially equal.

10. Apparatus of the class described comprising a normally fixed contact, a movable contact cooperable therewith, contact-actuating means including a constant pressure unit which is always exposed at one side to atmospheric pressure and at its opposite side to a substantially constant pressure, and a differential pressure motor exposed at one side to said substantially constant pressure and at its other side to a variable superatmospheric pressure, said contact-actuating means being operative to cause the movable contact to move relatively to the fixed contact, said constant pressure unit being so constructed and arranged as to be neutral as respects barometric variations at that differential pressure at which the actuating device causes the contacts to separate.

11. Apparatus of the class described comprising a normally fixed contact, a movable contact cooperable therewith, contact-actuating means including a constant pressure unit which is always exposed at one side to atmospheric pressure and at its opposite side to a substantially constant pressure and a differential pressure motor exposed at one side to said substantially constant pressure and at its other side to a variable superatmospheric pressure, said contact-actuating means being operative to cause the movable contact to move relatively to the fixed contact, loading means constantly urging the movable contact toward the fixed contact and thereby determining the differential pressure at which said contacts shall separate, said constant pressure unit being so constructed and arranged as to be neutral as respects barometric variations at any differential pressure at which the actuating device causes the contacts to separate.

12. Apparatus of the class described comprising a normally fixed contact, a movable contact cooperable therewith, contact-actuating means including a constant-pressure unit having a pair of opposing pressure-responsive elements each of which is always externally exposed to atmospheric pressure and which collectively define a pressure chamber, and a pressure motor housed within said pressure chamber and which responds to differential internal and external pressures thereby to cause the movable contact to move relatively to the fixed contact, spring-loading means operative to urge the movable contact toward the fixed contact thereby to determine the differential pressure at which said contacts shall separate, and means operative so to adjust the opposing pressure-responsive elements as to make the constant-pressure unit neutral as respects barometric variations whenever the motor is exposed to a differential pressure which causes the contacts to separate.

13. Apparatus of the class described comprising a normally fixed contact, a movable contact cooperable therewith, contact-actuating means including a constant pressure unit having a pair of opposing, pressure-responsive axially aligned bellows collectively defining a pressure chamber and each of which is always exposed externally to atmospheric pressure and a pressure motor which responds to differential internal and external pressures thereby to cause the movable contact to move relatively to the fixed contact, said pressure motor being so arranged that it is externally exposed at all times to the pressure subsisting in the pressure chamber defined by the bellows, spring-loading means urging the movable contact toward the fixed contact thereby to determine the differential pressure at which said contacts shall separate, and means operative to adjust the normally fixed contact so as to change the position of the movable contact at which the latter will separate from the fixed contact and thereby concomitantly so relatively to adjust the opposed bellows devices as to make the constant-pressure unit neutral as respects barometric variations whenever the motor is exposed to a differential pressure such as to cause the contacts to separate.

14. Apparatus of the class described comprising a normally fixed contact, a movable contact cooperable therewith, contact-actuating means including a constant-pressure unit having a pair of opposed, movable, pressure-responsive elements each exposed at one side to atmospheric pressure and at its opposite side to the same substantially constant pressure, a rigid actuator member connected to both pressure-responsive elements, a pressure-responsive motor having a pressure-sensitive element which is so located and arranged as always to be exposed at one side to the aforesaid substantially constant pressure subsisting at one side of the pressure-sensitive element and at its opposite side to a variable pressure, means connecting said motor to the actuator member, a movable contact carried by the actuator member, a normally fixed contact cooperable with said movable contact, loading means acting on the actuator member and urging the movable contact toward the fixed contact thereby to determine the pressure at which the motor shall cause the contacts to separate, the opposed pressure-responsive elements being balanced as respects barometric variations whenever the contacts separate.

15. Apparatus of the class described comprising a constant-pressure unit comprising a pair of opposed bellows devices, means connecting the adjacent ends of said devices to a movable contact, a fixed contact cooperable with the movable contact, means supplying pressure fluid at the same, substantially constant pressure to the interior of each of said bellows devices, a contact-actuating bellows device housed within said constant-pressure unit, means so connecting the latter to the contact as to cause the contact to move in response to differential pressure exerted upon the interior and exterior respectively of said contact-actuating bellows device, means supplying fluid at variable pressure to the interior of said latter bellows device, and loading means operative to oppose separation of the movable contact from the fixed contact, said loading means being adjustable thereby to vary the pressure at which said contacts separate, the opposed bellows devices being so designed and arranged as to be substantially neutral to variations in atmospheric pressure throughout the range of adjustment of said loading means.

16. Apparatus of the class described comprising a constant-pressure unit including a pair of opposed axially aligned bellows devices having their adjacent ends rigidly united, a contact-actuating bellows housed within one of said opposed bellows devices, means rigidly connecting the movable end of the actuating bellows to the movable end of the bellows device within which it is housed, a normally fixed contact, a movable contact cooperable therewith, means operative to transmit motion from the movable end of the actuating bellows to the movable contact, the opposed bellows devices being externally exposed to the atmosphere and internally exposed to the same, substantially constant fluid pressure, and the actuating bellows device being internally exposed to a variable fluid pressure, loading means urging the movable contact toward the fixed contact, and means whereby the fixed contact may be so adjusted that, for a given pressure differential between the interior and exterior of the actuating bellows, the constant-pressure unit will be neutral as respects barometric changes.

17. Apparatus of the class described comprising a pair of relatively movable electrical contacts and motor means for moving one relatively to the other, said motor means comprising an actuating bellows constituting contact-actuating means and which is designed to contain fluid whose pressure varies, and a housing unit for the actuating bellows including a pair of coaxial opposed bellows devices having their adjacent movable ends rigidly united, said opposed bellows devices containing fluid at substantially constant pressure, means rigidly uniting the movable end of the actuator bellows to the housing unit in the plane of union of the ends of the opposed bellows devices, rigid elements projecting at diametrically opposite sides of the housing unit at the plane of union of the ends of the opposed bellows, anchorage means for one of said projecting elements about which said latter element may rock, the movable contact being carried by the other of said projecting elements, and means urging the movable contact toward the fixed contact.

18. Apparatus of the class described comprising a pair of relatively movable electrical contacts and motor means for moving one relatively to the other, said motor means comprising an actuating bellows constituting contact-actuating means and which is designed to contain fluid whose pressure varies, and a housing unit for the actuating bellows including a pair of coaxial opposed bellows devices having their adjacent movable ends rigidly united, said opposed bellows devices containing fluid at substantially constant pressure, a rigid bar extending diametrically across the housing unit at the plane of union of the opposed ends of the bellows devices, means rigidly uniting the movable end of the actuator bellows to the bar, the opposite ends of the bars projecting outwardly beyond the walls of the housing unit, one projecting end of the bar carrying the movable contact, a resilient bracket so united to the opposite end of the bar as to constitute a spring fulcrum for the latter, said bracket constantly tending to swing the bar about that end at which the bracket is connected, and an adjustable spring connected to that end of the bar which carries the movable contact.

19. Apparatus of the class described comprising a pair of relatively movable electrical contacts and motor means for moving one relatively to the other, said motor means comprising an actuating bellows constituting contact-actuating means and which is designed to contain fluid whose pressure varies, and a housing unit for the actuating bellows including a pair of coaxial opposed bellows devices having their adjacent movable ends rigidly united, said opposed bellows devices containing fluid at substantially constant pressure, the outer surfaces of said opposed bellows devices being exposed to atmospheric pressure, a rigid bar extending diametrically across the housing unit at the plane of union of the opposed bellows devices, said bar being rigidly connected to the movable end of the actuator bellows, the opposite ends of the bar projecting outwardly beyond the walls of the housing unit, one projecting end of the bar carrying the movable contact, loading means engaging the projecting ends of the bar and tending to move the movable contact toward the fixed contact and constantly to contract one of the bellows devices and to expand the other, and means for so positioning the fixed contact that the opposed bellows are collectively neutral to barometric variations whenever the movable contact separates from the fixed contact.

20. Apparatus of the class described comprising a pair of relatively movable electrical contacts and motor means for moving one relatively to the other, said motor means comprising an actuating bellows constituting contact-actuating means and which is designed to contain fluid whose pressure varies, and a housing unit for the actuating bellows including a pair of coaxial opposed bellows devices having their adjacent movable ends rigidly united, said opposed bellows devices containing fluid at substantially constant pressure, a rigid bar extending diametrically across the housing unit at the plane of union of the opposed ends of said bellows devices, means rigidly uniting the movable end of the actuator bellows to the bar, the opposite ends of the bar projecting outwardly beyond the walls of the housing unit, one end of said bar carrying the movable contact, a constantly stressed spring engaging the opposite projecting end of the bar, a loading spring engaging the projecting end of the bar which carries the movable contact, and means for adjusting the tension of the latter spring.

21. Apparatus of the class described comprising contact-actuating means including a pair of opposed, axially aligned, constant-pressure bellows devices having their adjacent movable ends rigidly united, each of said bellows devices being exposed internally to the same, substantially constant fluid pressure and exposed externally to the atmosphere, a variable pressure bellows device internally exposed to a variable pressure and externally exposed to the same constant pressure which subsists within each of said opposed bellows devices, means operative to transmit motion from the variable pressure bellows device to the rigidly connected ends of the opposed bellows devices whereby the variable pressure bellows devices determines the position of said rigidly connected ends, a normally fixed but adjustable contact, a movable contact cooperable with the fixed contact, means connecting said movable contact to the rigidly united ends of the opposed bellows devices whereby the position of the movable contact is determined by the location of said rigidly connected ends, and adjustable loading means urging the movable contact toward the fixed contact and operative to prevent separation of the movable contact from the fixed contact until the difference between the internal and external pressures, acting on the variable pressure bellows device, drops to a predetermined value within a selective range of values, the opposed bellows devices being balanced as respects variation in barometric pressure when the movable contact is just at the point of separation from the fixed contact whatever the differential pressure value within said range at which contact is broken.

22. Apparatus of the class described comprising a pair of axially aligned constant-pressure bellows closed and fixed at their remote ends, their adjacent ends being movable and rigidly united, an actuator bellows housed within one of the aforesaid bellows, said actuator bellows being closed and fixed to the closed end of the bellows within which it is housed, and having its movable end rigidly united to the movable end of the bellows which houses it, an actuator member rigidly secured to the movable end of the actuator bellows and extending outwardly beyond the confines of the housing bellows, a movable contact connected to said actuator member for movement by the latter, a normally fixed contact with which said movable contact cooperates, spring loading means connected to the actuator member and constantly urging the movable contact toward the fixed contact, and means operative to supply fluid at substantially constant pressure to the interior of said pair of constant-pressure bellows and to supply fluid at variable pressure to the interior of the actuating bellows.

23. Apparatus of the class described comprising a constant-pressure unit including opposed axially aligned bellows devices externally exposed to the atmosphere, the adjacent ends of said bellows devices being movable but rigidly connected and the remote ends of said devices being closed and fixed, thereby defining an air-tight chamber, an actuator bellows housed within said chamber, the interior of said actuator bellows being exposed to variable fluid pressure, one end of said actuator bellows being movable and rigidly connected to the movable end of one of the housing bellows and its opposite end being fixed to the closed end of said housing bellows, a rigid bar extending transversely of the constant-pressure unit, said bar being always located in the plane of the movable ends of the opposed bellows devices and being rigidly secured to the movable end of the actuator bellows, a movable contact carried by said bar, a fixed contact cooperable with the movable contact, and loading means engaging the opposite ends respectively of said bar, said loading means being operative to urge the movable contact toward the fixed contact and being adjustable thereby to vary the force necessary to separate said contacts.

24. Apparatus of the class described comprising a constant-pressure unit including rigid heads spaced a fixed distance apart and a side wall connecting the heads and with the latter defining an air-tight chamber, an actuating bellows housed within said chamber, one end of said bellows being secured to one of said heads and the other end of the bellows being movable, the interior of the bellows being exposed to variable fluid pressure, a rigid actuator bar extending transversely across the constant-pressure unit and passing leak-tight through the side wall of the latter, said bar being rigidly attached to the movable head of the bellows, the side wall of the pressure unit being so constructed and arranged as to permit bodily movement of the bar relatively to said heads, the opposite ends of the actuator bar projecting outwardly beyond the confines of the constant-pressure unit, a movable contact mounted on one end of said bar, a normally fixed contact with which the movable contact cooperates, and a spring connected to each end of the bar, one of said springs constituting a fulcrum for the bar and the other being operative to urge the movable contact toward the fixed contact, and means for adjusting each of said springs.

25. Apparatus of the class described comprising a constant-pressure unit including rigid heads spaced a fixed distance apart and a side wall connecting the heads and with the latter defining an air-tight chamber, an actuating bellows housed within said chamber, one end of said bellows being secured to one of said heads and the other end of the bellows being movable, the interior of the bellows being exposed to variable fluid pressure, a rigid actuator bar extending transversely across the constant-pressure unit and passing leak-tight through the side wall of the latter, said bar being rigidly attached to the movable head of the bellows, the side wall of the pressure unit being so constructed and arranged as to permit bodily movement of the bar relatively to said heads, a movable contact carried by the bar, a normally fixed contact cooperable with the movable contact, spring means connected to that end of the bar which carries the movable contact, and fulcrum means for the opposite end of the bar, the spring means being operative to urge the movable contact toward the fixed contact.

26. Apparatus of the class described comprising a constant pressure unit including opposed axially aligned bellows devices externally exposed to the atmosphere, the adjacent ends of said bellows devices being movable but rigidly connected and the remote ends of said devices being closed and fixed, thereby defining an air-tight chamber, an actuator bellows housed within said chamber, the interior of said actuator bellows being exposed to variable fluid pressure, one end of said actuator bellows being movable and rigidly connected to the movable end of one of the housing bellows and its opposite end being fixed to the closed end of said housing bellows, a rigid bar extending diametrically of the opposed bellows devices intermediate their movable ends, said bar being rigidly fixed to said ends and to the movable end of the actuator bellows, a movable contact carried by said bar, a normally fixed contact cooperable with the movable contact, adjustable loading means acting upon each end respectively of the bar so as to urge the movable contact toward the fixed contact and thereby to determine, within a selected pressure range, the differential pressure at which the actuating bellows will cause the contacts to separate, and means for adjusting the normally fixed contact thereby so to position the bar as to make the opposed bellows devices collectively neutral to barometric variations within said pressure range.

27. A switch actuated control unit for use in an aircraft fuel supply system of the kind wherein an alarm is caused to operate by the closure of an electric switch, an electric switch constituting an element of said unit, and means defining a chamber in open communication with the fuel supply line, there being at least two thicknesses of imperforate metal between the switch and the fuel in said chamber, one thickness being a movable wall of said chamber, a pressure motor, said movable wall constituting the pressure sensitive element of said motor, an air-tight casing which houses the pressure motor and within which a substantially constant fuel pressure is always maintained, the other of said thicknesses of metal forming a wall of said casing, an actuator operative to transmit motion from said movable wall to the switch, and means operative adjustably to determine, within a substantial range, the fluid pressure in the fuel line at which the switch will close.

28. A switch actuating control unit for use in an aircraft fuel supply system of the kind wherein a carburetor receives inflammable fuel from a supply reservoir and air at super-charger pressure from a super-charger, an electric switch constituting an element of said unit and including a fixed contact and a movable contact and means defining a chamber which is in open communication with the fuel supply line, there being at least two thicknesses of imperforate non-combustible material interposed between the switch and said chamber, one of said thicknesses of material being a movable wall of said chamber, a pressure motor, said movable wall constituting the pressure sensitive element of said motor, an air-tight casing which houses the pressure motor, the other of said thicknesses of metal forming a wall of said casing, the space within the housing and exterior to the pressure motor being always at supercharger pressure, and means whereby the switch may be set to close at any selected fluid pressure in the fuel supply line within a substantial range of pressures, the parts being so constructed and arranged that the operation of the switch is unaffected, at any such setting, by variations in atmospheric pressure.

29. A switch actuating control unit for use in an aircraft fuel supply system of the kind wherein a carburetor receives inflammable fuel from a supply reservoir and air at super-atmospheric pressure from a super-charger, said unit comprising an air-tight housing defining a chamber in which super-charger pressure is always maintained, a pressure fluid motor within said housing, said motor including a movable wall one side of which is exposed to the super-charger pressure and the opposite side of which is exposed to fuel pressure, a switch located wholly outside of said air-tight housing and comprising a fixed contact and a movable contact, means operative to transmit motion from the movable wall of the pressure motor to the movable switch contact and adjustable loading means operative to urge the movable contact toward the fixed contact.

30. A control unit of the class described comprising a switch having a pair of relatively movable contacts, means defining a chamber for inflammable fluid whose pressure varies, there being at least two thicknesses of imperforate metal between the switch contacts and the inflammable fluid in said chamber, a pressure motor, one of said thicknesses being a movable wall of said chamber and constituting the pressure sensitive element of said motor, an air-tight casing which houses the motor, the other of said thicknesses of metal constituting a wall of said casing means for transmitting motion from the movable wall of the pressure motor to the switch thereby to move one of the contacts relatively to the other.

31. A control unit of the class described comprising an electric switch having relatively movable contacts, means defining a chamber which contains inflammable fluid whose pressure varies, there being at least two thicknesses of imperforate non-combustible material between the inflammable fluid in said chamber and the switch contacts, a metallic bellows and a casing which houses the bellows, one at least of said thicknesses of material being a movable wall of said bellows and the other of said thicknesses of material being a wall of the casing, and an actuator means for transmitting motion from said movable wall to the switch thereby to move one of the contacts relatively to the other.

ELMER H. HAMMOND.
ERNEST H. GRAUEL.